United States Patent [19]

Behrens et al.

[11] 4,013,977
[45] Mar. 22, 1977

[54] AERODYNAMIC WINDOW FOR CHEMICAL LASER

[75] Inventors: Hermann W. Behrens; Gerhard L. Grohs, both of Rancho Palos Verdes; Charles L. Dailey, Palos Verdes Estates, all of Calif.

[73] Assignee: TRW Inc., Redondo Beach, Calif.

[22] Filed: Sept. 11, 1975

[21] Appl. No.: 612,619

[52] U.S. Cl. .......................... 331/94.5 D; 330/4.3
[51] Int. Cl.² .......................................... H01S 3/02
[58] Field of Search .................. 331/94.5; 330/4.3; 350/319

[56] References Cited
UNITED STATES PATENTS 3,949,321  4/1976  Lee ............................. 331/94.5 D

*Primary Examiner*—William L. Sikes
*Attorney, Agent, or Firm*—Edwin A. Oser; Donald R. Nyhagen

[57] ABSTRACT

A low pressure gas laser is provided with an aerodynamic window for the generated high power laser beam. The window comprises a duct with an oblique opening located in the supersonic part of and aligned with the axis of a Laval nozzle, having an atmospheric entrance. This permits extraction of the beam from the laser without any contact through a solid window.

4 Claims, 7 Drawing Figures

AERODYNAMIC WINDOW FOR CHEMICAL LASER

BACKGROUND OF THE INVENTION

This invention was made in the course of or under a contract or subcontract with the Department of the Army.

This invention relates to a new and improved aerodynamic window for a laser operating at very low cavity pressure.

Many types of gas lasers such as chemical lasers, gas dynamic lasers, transfer lasers, and in general, those lasers which operate at low cavity pressure, require that the optical cavity be enclosed to maintain a suitable pressure differential between the cavity and atmosphere. At relatively low power, the use of an optical window may be employed in a chemical laser because the effect of heat distortion and optical integrity are not too severe.

However, at high power, optical windows become very hot and either break or lose their properties of good optical transmission due to heat distortion.

Consequently, aerodynamic windows have been developed for gas dynamic lasers to eliminate the necessity for passing the output beam through a solid optical window. A summary of such windows is given by Zimet, E., "Aerodynamic Windows for Laser Beams", Naval Ordinance Laboratory Report No. NOLTR-73-66, 1973. These prior art aerodynamic windows degrade the laser beam quality significantly and ingest gas into the laser cavity.

It is therefore an object of this invention to provide a high power laser operating at low cavity pressure with a simple aerodynamic window which passes a laser beam from the cavity to the atmosphere with a minimum of beam distortion and no gas leakage into the laser cavity.

Other objects of the invention will become apparent from the description and drawings to follow.

Figure 1:
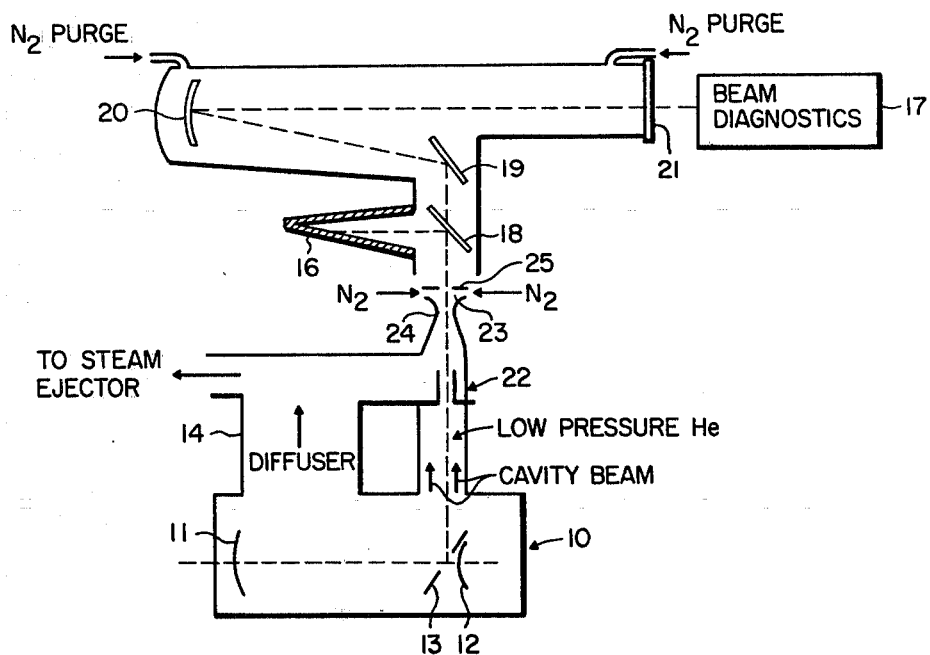
FIGS. 1 and 2 are schematic views showing the operation generally of the aerodynamic window of this invention and its function in a laser.

In the drawings, FIG. 1 shows a laser cavity 10 maintained at a relatively low pressure compared to atmospheric; typical cavity pressures range from 1 to 200 Torr. This range of cavity pressure is commonly employed in chemical lasers, gas dynamic lasers and transfer lasers. Mirrors 11, 12 are unstable oscillators for amplifying the laser radiation, and scraper mirror 13 outcouples the radiation beam from the laser system. Exhaust gases from the laser cavity are removed through diffusers 14 and a steam ejector (not shown), where they are chemically neutralized; the steam ejector also drives the gas flow past the aerodynamic window.

A beam test system including a calorimeter 16 and a beam diagnostic device 17 are provided to test the beam intensity and quality. A watercooled hole transmission grating 18 reflects the cavity beam into the calorimeter 16 and transmits part of the beam onto a turning mirror 19, focussing mirror 20 and through a $CaF_2$ optical flat window 21 to the beam diagnostic device 17. The beam test system is maintained at about atmospheric pressure by means of an $N_2$ purge.

In actual laser operation, the beam test system is removed and the beam is passed directly to atmosphere for impingment on a target.

The aerodynamic window 22 of this invention passes the beam from the low pressure cavity through the interior to the ambient atmosphere, without transmission through a solid window. Thereafter, it can be directed to either the beam test system or a distant target.

Aerodynamic flow is provided from a supply of $N_2$ or Argon which feeds into a settling chamber 23 at atmospheric pressure, and then into a Laval nozzle 24 which generates a uniform supersonic flow field at low pressure. The supersonic flow is deflected by the leading edge of the window, and is removed from the system by the steam ejector pump. The flow in the settling chamber 23 is confined by a plate 25 with an orifice of dimensions matched to that of the beam emerging from the Laval nozzle 24. This permits the beam to pass from low to high pressure with only a minimal loss of beam quality. In the duct 26, a flow of helium countercurrent to the $N_2$ flow is employed both to maintain a pressure within the optical duct (e.g., 10 Torr) and to purge laser reactants from the cavity 10 enclosure surrounding mirrors 12, 13.

Figure 2:
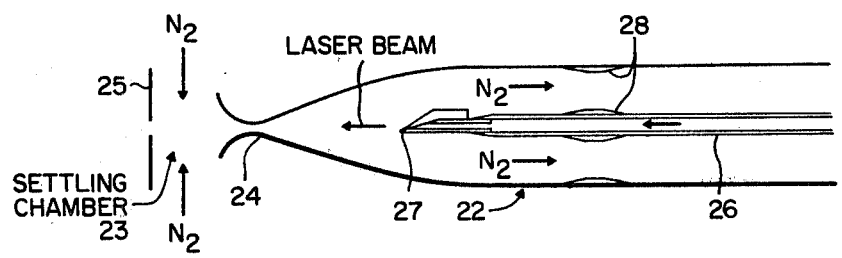

FIG. 2 shows details of the window 22 which comprises an optical duct 26 leading from the cavity into the supersonic flow, through which the laser beam passes. The leading edge 27 of the optical duct, which is stainless steel, is preferably wedge-shaped and is inclined about 14° to the direction of $N_2$ gas flow; however, the inclination can be varied from about 10°–30° to the gas flow. A plurality of supersonic diffusers 28 are provided along the optical duct to provide pressure recovery. Typical dimensions of the Laval nozzle 24 and optical duct wedge 27 and 1½ inches × 5 inches, the orifice plate 25 being similarly contoured.

Figure 3:
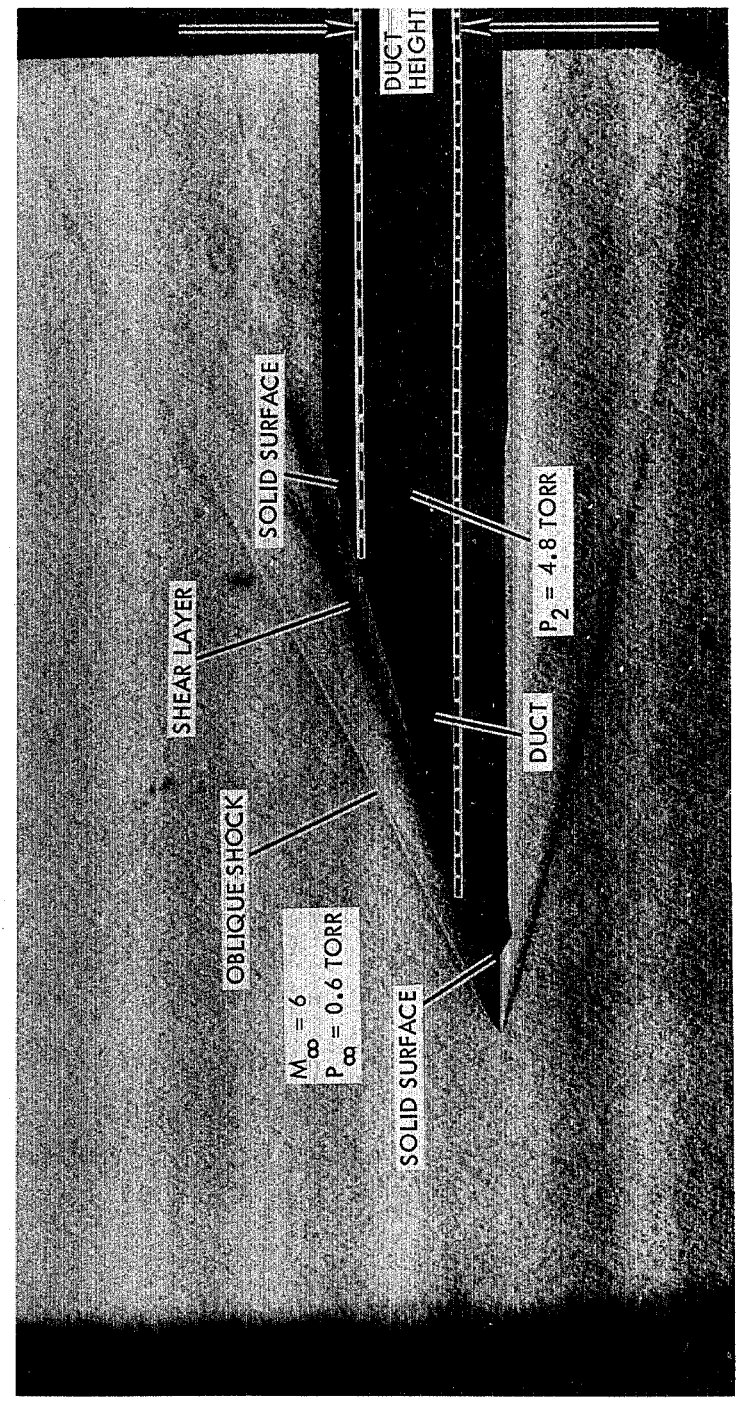
FIG. 3 is a schlieren photograph of the aerodynamic flow past the oblique opening of the window shown in FIG. 2.

FIG. 3 shows a schlieren photograph of the $N_2$ flow past the oblique optical duct opening; argon may also be employed since its refractive index is very close to that of air. It will be apparent that the leading edge of the oblique optical duct opening produces an oblique stock wave across the face of the wedge, without entering the optical duct itself. The nitrogen velocity is Mach 4.7 at a pressure of 2 Torr and a temperature of 55° K. This low temperature would condense water vapor in ambient air entrained into the flow, causing severe beam degradation. Consequently, this requires that the $N_2$ pressure in the settling chamber 25 be maintained at a slightly higher (0.05) psi pressure than atmospheric to prevent moist atmospheric air from entering the window. The nitrogen expands tangentially across the duct opening to a pressure of 10 Torr without entering the duct itself, since the helium pressure inside the duct is also 10 Torr. The $N_2$ gas then decelerates to subsonic speed and is pumped out of the system by the ejector pump.

The optical performance of the window may be based on: (a) phase distortion; (b) incorrectable beam quality degradation; and (c) beam steering and jitter.

Phase distortion occurs when the beam is focussed slightly in the nozzle. This may be corrected with a cylindrical mirror to less than 0.017 $\lambda$, for a throat height of 0.75 inches and a radius of curvature of the nozzle at the throat of 10 nozzle half-heights.

Beam degradation (loss of intensity), was calculated as < 1% at $\lambda = 3.8$ $\mu$m. The formula employed was $I/I_o = 3 \times 10^{-10} (H)/\lambda \cdot (\Delta \rho)^2/(\rho s)^2 \cdot 1/\sin^3\delta$ where $H$ = duct height; $\lambda$ is the wave-length; $\alpha\rho$ the density gradient across the shear layer; $\rho_s$ the atmospheric reference density; and $\delta$ the duct exit angle with respect to the nozzle axis.

Beam steering only amounts to 12$\mu$ radians; beam jitter is only a fraction of beam steering.

Figure 4:
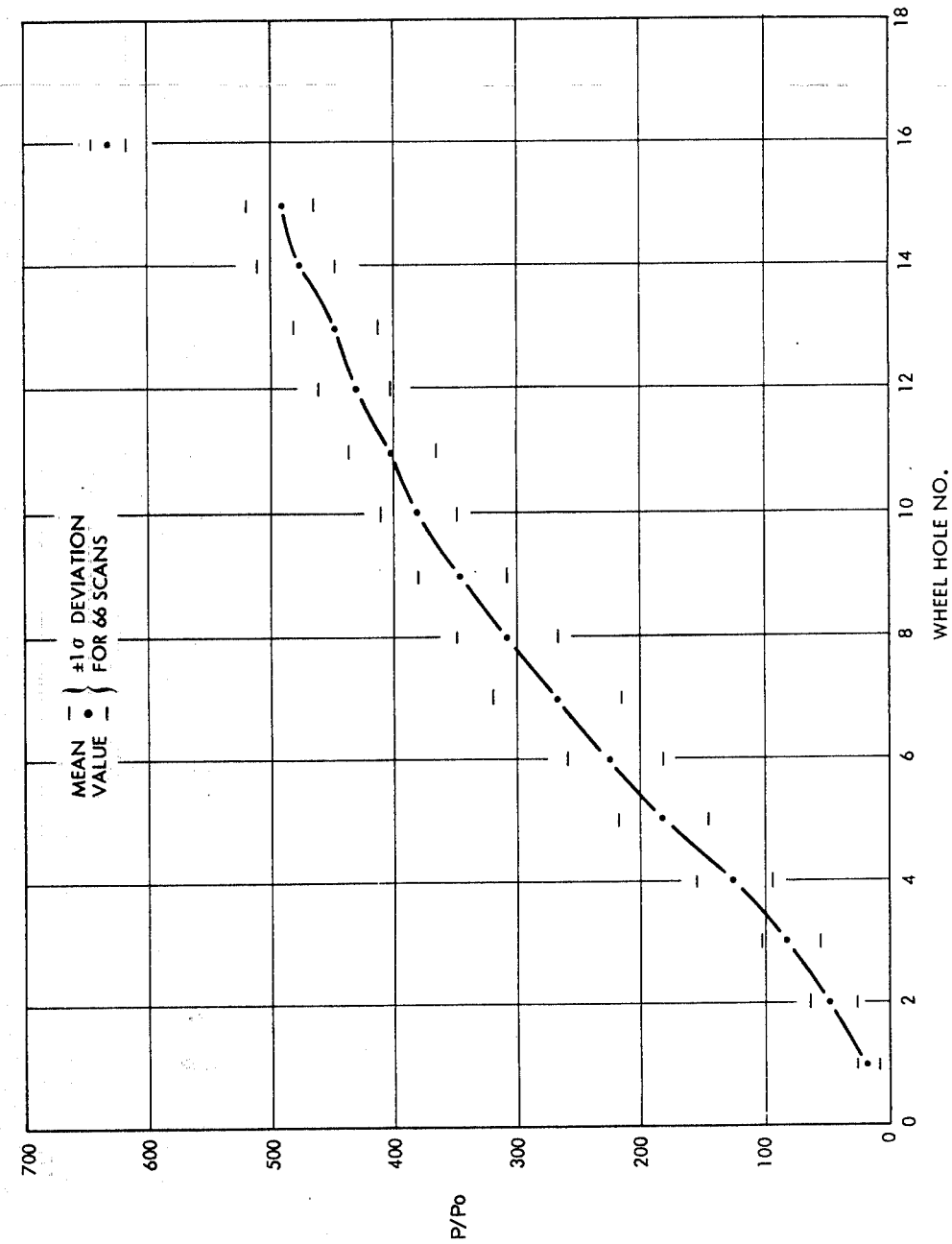
FIGS. 4 and 5 are graphs showing the differences between the power output from an HF/DF* laser when emitting in a vacuum and when employing the aerodynamic window of this invention.
Figure 5:
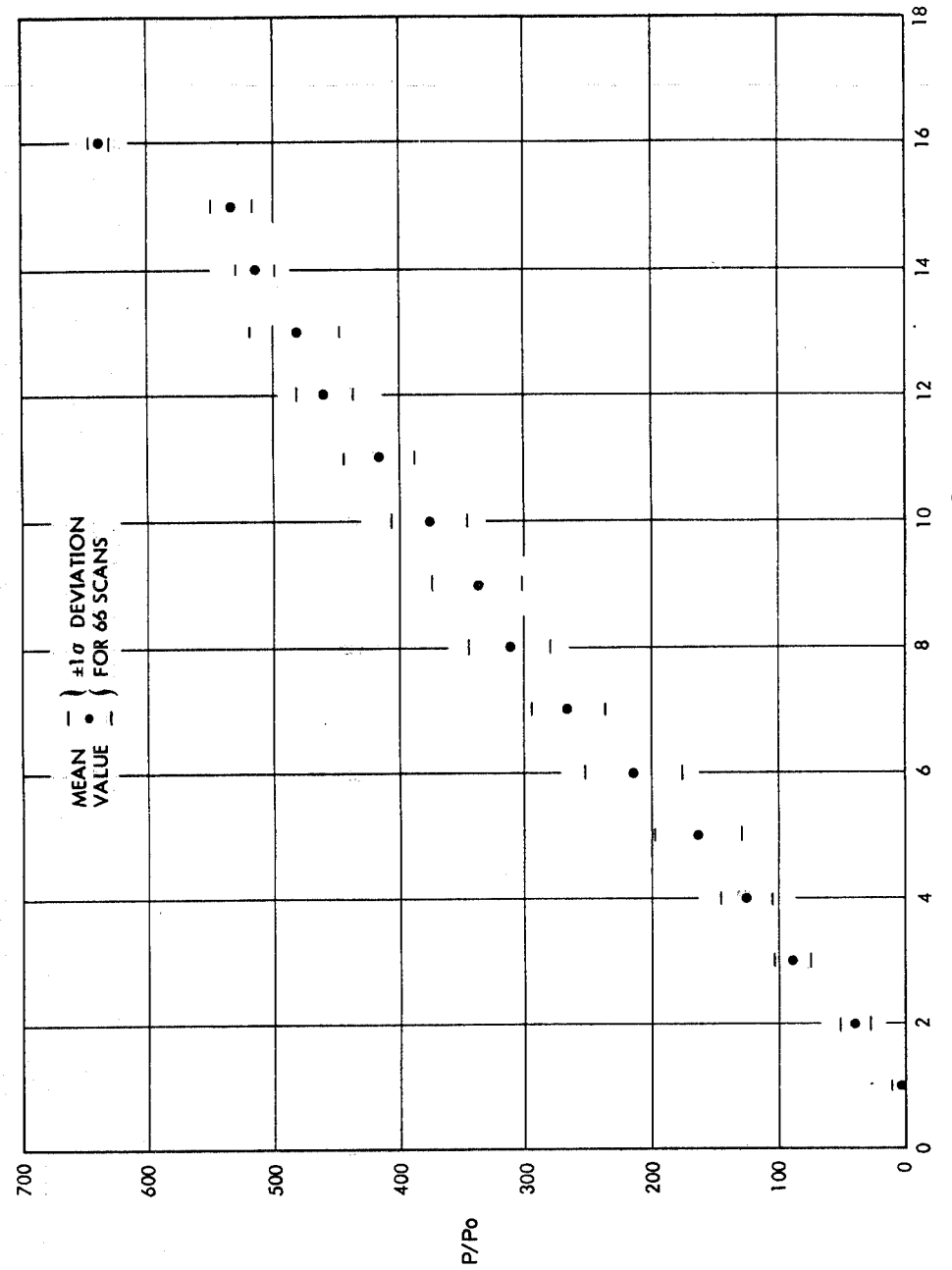

The graphs of FIGS. 4 and 5 illustrate the difference between a beam extracted through the aerodynamic window and that in vacuum without the window.

The test equipment employed was an integrated irradiance analyzer consisting of a thin disc rotating at 20 revoluations per second and containing 51 rectangular holes (P) with an aspect ratio of 4:1. The holes range in areas from 0.00389 cm$^2$ to 0.864 cm$^2$. A sixteenth hole, hexagonally shaped, is designed to capture all the power in the zero order of the far field ($P_o$). The integrated power ratio $P/P_o$ is 66 for 66 scans for each of the 16 holes, the $P_o$ signal being shown at hole no. 16.

It will be observed that use of the aerodynamic window of this invention results in virtually no significant power change compared to emission in a vacuum.

Figure 6:
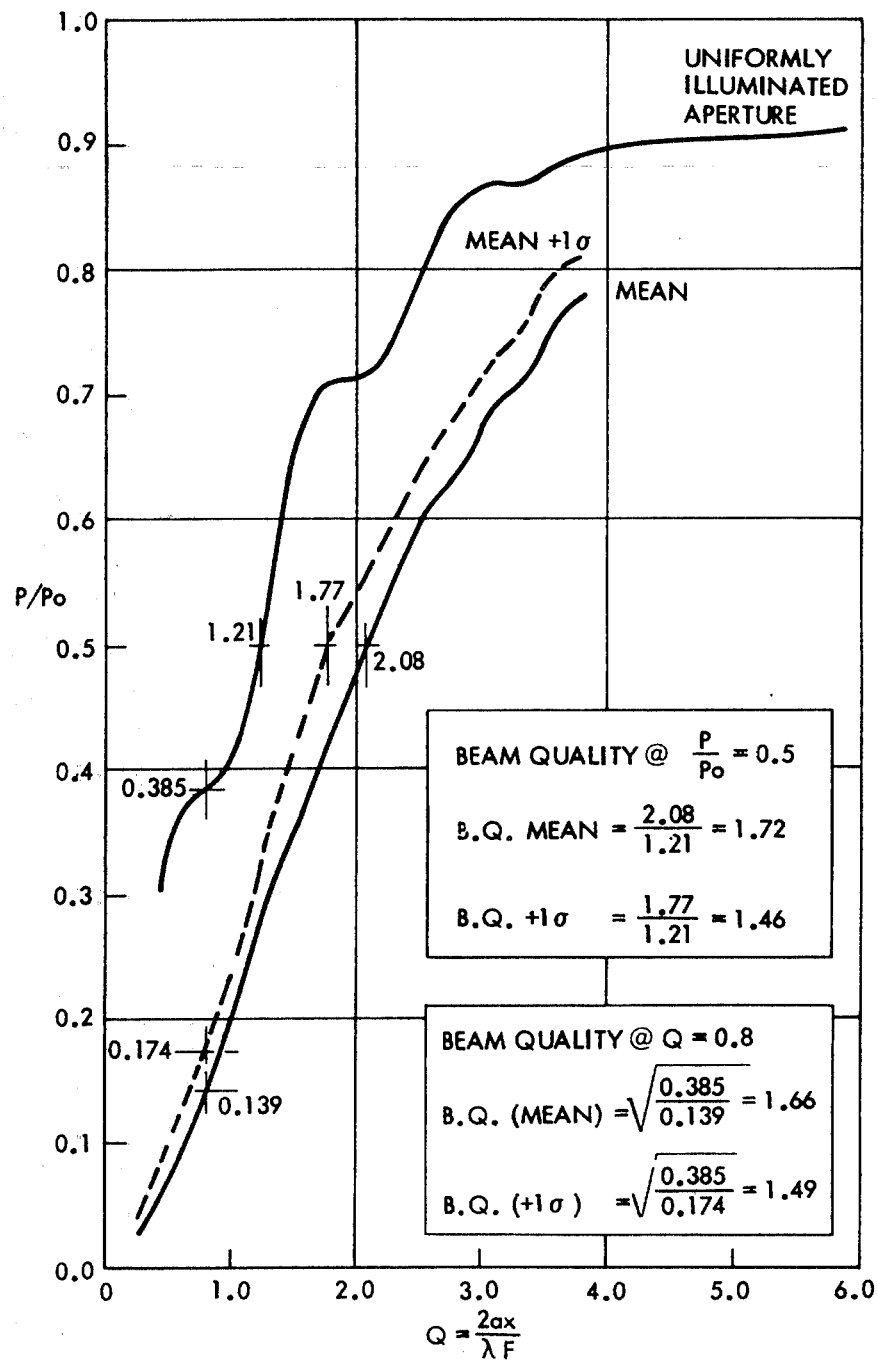
FIGS. 6 and 7 are graphs comparing power versus beam quality in a laser employing the aerodynamic window of this invention and one emitting in a vacuum.
Figure 7:
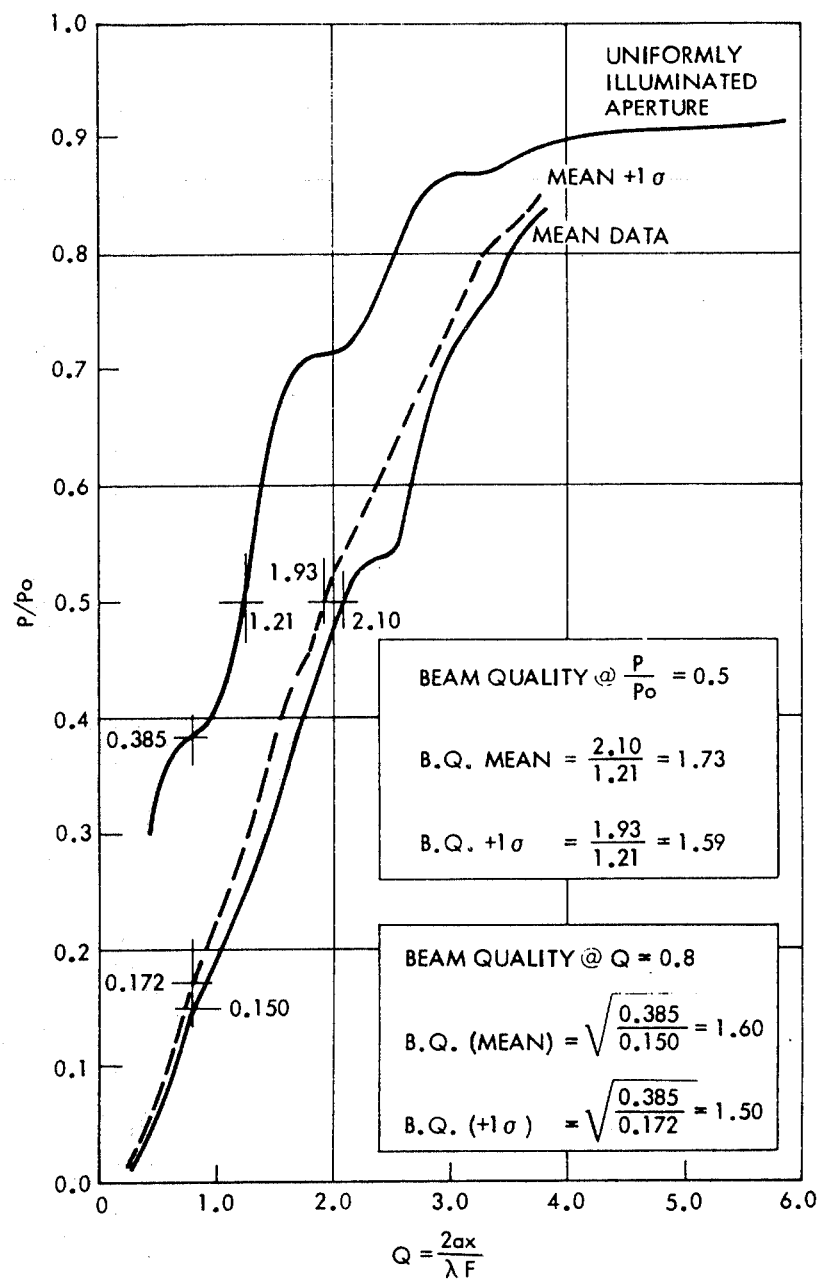

In FIGS. 6 and 7 a graphical comparison is made between $P/P_o$ and beam quality, Q, where $Q = (2 ax/\lambda F)$. The components of the equation may be defined by comparing the real power contained within a certain solid angle to the predicted uniphase power. The solid angle is defined as $A/F^2$ where A is the collecting aperture and F is the focal length of the focussing mirror. If $A/F^2 << 4\pi$ and the beam is best described in terms of Cartesian geometry, the solid angle may be expressed as the product of two angles, $\theta_1 = x/F$ and $\theta_2 = y/F$, where $x$ and $y$ are the dimensions of a rectangular collecting aperture. To compare the measured integrated irradiance (power collected), these angles are normalized to the angle subtended by the main lobs of a uniformly illuminated near-field aperture of size $2a \times 2b$, that is, the angles $\lambda/a$ and $\lambda/b$. The resultant ratios are $Q = (ax)/\lambda F$ and $R = by/\lambda F$. In addition, if $b/a = x/y$, then $Q=R$ and the integrated irradiance is a function of a single variable, Q.

Beam quality may be specified by determining the value of Q which collects 50 percent of the near-field power and forming the ratio of this Q to the corresponding $Q_1$ for a uniphase beam of the same aperture. The beam is then said to be $Q/Q_1$ times diffraction limited. Alternatively, the beam quality may be expressed in terms of the ratio of the power in the central lobe of the ideal beam to the power in the experimental beam (Q - fixed).

It will be apparent from the graphs of FIGS. 6 and 7 that beam power as a function of beam quality is virtually unchanged when using the aerodynamic window of the invention, compared to extracting the beam in a vacuum.

Hence, the aerodynamic window of this invention does not significantly affect the optical performance of the beam. Furthermore, the device is simple in its construction, has no moving parts and does not require special manual controls during operation.

We claim:

1. A high power gas laser providing cavity pressures of about 1 to about 200 torr and having an aerodynamic window to permit a radiation beam to pass from the cavity to ambient atmosphere, said window comprising:
   a. an optical duct axially aligned and surrounding the beam, the interior of said duct being in communication with the laser cavity to maintain the duct at cavity pressure, said duct having an inclined leading edge; and
   b. means for providing a supersonic flow of gas against the leading edge of said duct, whereby the gas expands tangentially across the leading edge thereof and then flows along the exterior of said duct.

2. The gas laser defined in claim 1 wherein the leading edge of said duct is wedge shaped.

3. The gas laser defined in claim 1 wherein the leading edge of said duct makes an angle with respect to the gas flow of between about 10° to about 30°.

4. The gas laser defined in claim 1 wherein means is provided communicating with the interior of said duct to provide a flow of helium in a direction countercurrent to the supersonic gas flow.

* * * * *